(12) United States Patent
Fastow (10) Patent No.: US 9,135,918 B2
(45) Date of Patent: Sep. 15, 2015

(54) REAL-TIME DATA PATTERN ANALYSIS SYSTEM AND METHOD OF OPERATION THEREOF

(75) Inventor: Richard M. Fastow, Cupertino, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 702 days.

(21) Appl. No.: 13/123,698

(22) PCT Filed: Oct. 7, 2009

(86) PCT No.: PCT/US2009/059862
§ 371 (c)(1),
(2), (4) Date: Apr. 11, 2011

(87) PCT Pub. No.: WO2010/042631
PCT Pub. Date: Apr. 15, 2010

(65) Prior Publication Data
US 2011/0208519 A1    Aug. 25, 2011

Related U.S. Application Data

(60) Provisional application No. 61/195,743, filed on Oct. 10, 2008.

(51) Int. Cl.
*G10L 15/00* (2013.01)
*G10L 15/28* (2013.01)
*G10L 15/14* (2006.01)

(52) U.S. Cl.
CPC ............. *G10L 15/28* (2013.01); *G10L 15/14* (2013.01)

(58) Field of Classification Search
USPC .......... 704/238, 235, 270, 272, 231, 251, 255, 704/257, 240, 254, 256.1; 326/10; 439/67; 711/147; 365/201
See application file for complete search history.

(56) References Cited

U.S. PATENT DOCUMENTS

| | | | |
|---|---|---|---|
| 4,741,036 A | | 4/1988 | Bahl et al. |
| 5,164,990 A | | 11/1992 | Pazienti et al. |
| 5,410,654 A | * | 4/1995 | Foster et al. .................. 711/147 |
| 5,487,086 A | | 1/1996 | Bhaskar |
| 5,535,305 A | | 7/1996 | Acero et al. |

(Continued)

FOREIGN PATENT DOCUMENTS

| | | |
|---|---|---|
| DE | 197 44 690 A1 | 4/1999 |
| JP | 60-168196 A | 8/1985 |

(Continued)

OTHER PUBLICATIONS

Kimura, T., et al., "A Single Chip Self-Contained Speech Recognizer," *IEEE Journal of Solid-State Circuits:SC-18(3):344-349* (1983).

(Continued)

*Primary Examiner* — Huyen Vo (57) ABSTRACT

A method of operation of a real-time data-pattern analysis system includes: providing a memory module, a computational unit, and an integrated data transfer module arranged within an integrated circuit die; storing a data pattern within the memory module; transferring the data pattern from the memory module to the computational unit using the integrated data transfer module; and comparing processed data to the data pattern using the computational unit.

16 Claims, 6 Drawing Sheets

(56) References Cited

U.S. PATENT DOCUMENTS

| | | | |
|---|---|---|---|
| 5,539,859 | A | 7/1996 | Robbe et al. |
| 5,710,866 | A | 1/1998 | Alleva et al. |
| 5,794,197 | A | 8/1998 | Alleva et al. |
| 6,024,580 | A * | 2/2000 | Dangler et al. .................. 439/67 |
| 6,076,056 | A * | 6/2000 | Huang et al. .................. 704/254 |
| 6,425,064 | B2 | 7/2002 | Soderquist |
| 6,490,559 | B2 | 12/2002 | Budde et al. |
| 6,725,063 | B2 | 4/2004 | Choi |
| 7,228,275 | B1 | 6/2007 | Endo et al. |
| 7,231,019 | B2 | 6/2007 | Pascovici |
| 7,609,083 | B2 * | 10/2009 | Fuseya .............................. 326/10 |
| 8,352,265 | B1 | 1/2013 | Lin et al. |
| 2001/0056350 | A1 | 12/2001 | Calderone et al. |
| 2003/0110033 | A1 | 6/2003 | Nadjar et al. |
| 2004/0196709 | A1 * | 10/2004 | Ong .............................. 365/201 |
| 2007/0192109 | A1 | 8/2007 | Likens et al. |
| 2007/0288242 | A1 | 12/2007 | Spengler et al. |
| 2008/0221893 | A1 | 9/2008 | Kaiser |
| 2008/0255839 | A1 * | 10/2008 | Larri et al. .................... 704/238 |
| 2008/0306738 | A1 | 12/2008 | Lee et al. |
| 2009/0234651 | A1 | 9/2009 | Basir et al. |
| 2010/0276572 | A1 | 11/2010 | Iwabuchi et al. |
| 2011/0082694 | A1 | 4/2011 | Fastow et al. |

FOREIGN PATENT DOCUMENTS

| | | |
|---|---|---|
| JP | 5-189383 A | 7/1993 |
| JP | 6-167995 A | 6/1994 |
| JP | 2007-335076 A | 12/2007 |
| WO | WO-2006/030214 A2 | 3/2006 |
| WO | WO 2006/129762 A1 | 12/2006 |

OTHER PUBLICATIONS

Pawate, B.I. (Raj) and Robinson, P.D., "Implementation of an HMM-Based, Speaker-Independent Speech Recognition System on the TMS320C2x and TMS320C5x," Speech and Image Understanding Laboratory, Computer Sciences Center, Texas Instruments Incorporated (1996).

Jeffrey Schuster et al. 'Speech Silicon: An FPGA architecture for real-time hidden-markov-model based speech recognition' In: EURASIP Journal on Embedded Systems, vol. 2006. Article ID 48085, 2006, pp. 1-19.

Rajeev Krishna et al. 'Memory system design space exploration for low-power, real-time speech recognition' In: Proceedings of the 2nd IEEE/ACM/IFIP international conference on Hardware/software codesign and system synthesis, ISBN: 1-58113-937-3, Sep. 2004, pp. 140-145.

International Search Report for International application No. PCT/US2009/059862, 2009.

Non-Final Office Action for U.S. Appl. No. 12/852,970, mailed May 9, 2013; 8 pages.

Final Office Action for U.S. Appl. No. 12/852,970, mailed Oct. 11, 2013; 10 pages.

English-language translation of German-language Office Action for German Patent Application No. 11 2009 002 426, mailed Feb. 6, 2012; 2 pages.

English-Language translation of Japanese-language Office Action for Japanese Application No. 2011-531145, mailed Dec. 3, 2013; 3 pages.

English-Language Abstract of Japanese Patent Application Publication JP 6-167995 A; 1 page.

Notice of Allowance for U.S. Appl. No. 12/852,970, mailed Feb. 27, 2014; 13 pages.

Office Action for U.S. Appl. No. 14/258,076. mailed May 29, 2014; 9 pages.

USPTO—Final Rejection for U.S. Appl. No. 14/258,076 dated Oct. 14, 2014; 6 pages.

USPTO Notice of Allowance for U.S. Appl. No. 14/258,076 dated Feb. 5, 2015; 9 pages.

Written Opinion of the International Searching Authority for International Application No. PCT/US2009/059862 dated May 19, 2010; 4 pages.

* cited by examiner

REAL-TIME DATA PATTERN ANALYSIS SYSTEM AND METHOD OF OPERATION THEREOF

CROSS-REFERENCE TO RELATED APPLICATION(S)

This application is a 371 National Stage Entry of PCT Application Number PCT/US09/59862 filed Oct. 7, 2009, which claims the benefit of U.S. Provisional Patent Application serial number 61/195,743 filed Oct. 10, 2008, and the subject matter thereof is incorporated herein by reference thereto.

TECHNICAL FIELD

The present invention relates generally to a real-time data pattern analysis system, and more particularly to a system for speech recognition.

BACKGROUND ART

Real-time data pattern recognition is increasingly used to analyse data streams in the process of controlling small and networked electronic systems. For example, speech recognition systems are increasingly common in the mobile, server, and PC markets. On the low end of the capability spectrum, speech recognition systems need to recognize connected digits (vocabulary of 10) or alphabet letters (vocabulary of 26). While on the high end of the spectrum, a 5,000 word continuous dictation capability may be necessary. If grammatical models are also included then a 20,000 trigram vocabulary could be required.

The word error rate in speech recognition systems is significantly higher than for human speech recognition. In some cases (in particular in noisy environments) machine speech recognitions systems may have an order of magnitude higher error rate than a human listener.

Large vocabulary speech recognition systems are typically composed of a signal processing stage (feature extractor) followed by an acoustic modeling stage (senone calculator), followed by a phoneme evaluator (Viterbi search), and followed by a word modeler.

In the signal processing stage, techniques such as linear predictive coding (LPC) or fast fourier transforms (FFT) are applied in order to extract a parametric digital representation of the incoming signal. This procedure is repeated at regular time intervals, or frames, of approximately 10 ms.

In the acoustic modeling stage, these parametric observation vectors are then compared to the senones stored in memory (the term "senone" denotes a basic subphonetic unit). The comparison of the parametric observation vector with the senones is a computation and memory intensive task, as up to 20,000 senones are compared every 10 ms. During this comparison, a multivariate Gaussian probability may be calculated for each senone, and represents the mathematical "distance" between the incoming feature vector and each of the stored senones.

In the phoneme evaluation stage, Hidden Markov Models (HMMs) may be used to model phonemes as a sequences of senones, where specific senones are probabilistically associated with a state in an HMM. For a given observed sequence of senones, there is a most likely sequence of states in a corresponding HMM. This corresponding HMM is then associated with the observed phoneme. In order to find the most likely phoneme corresponding to a sequence of senones, the Viterbi algorithm is often employed.

The Viterbi algorithm performs a computation which starts at the first frame and then proceeds one frame at a time, in a time-synchronous manner. A probability score is computed for each senone in the HMMs being considered. Therefore, a cumulative probability score is successively computed for each of the possible senone sequences as the Viterbi algorithm analyzes the sequential observation vectors. By the end of an utterance, the HMM having the highest probability score computed by the Viterbi algorithm provides the most likely phoneme for the entire sequence.

The acoustic modeling stage is the computational bottleneck of the speech recognition process. This is due to two factors: 1) the large number of floating point calculations required to evaluate the multivariate Gaussian probabilities of each senone, and 2) the memory bandwidth limitations of accessing the senone data.

Evaluation of a standard SPHINX3 speech recognition system on a 1.7 GHz x86 microprocessor based platform showed that a 1000-word task took 160% longer than real time to process and consumed a significant portion of the memory bus bandwidth. This bottleneck severely restricts the ability of mobile appliances to run large vocabulary speech recognition software with a similar architecture, due to the slower processing speed and reduced power requirements of mobile processors.

Issues with the speed and storage/processing capabilities of speech recognition systems exemplify complexities associated with analysing data streams in real-time or close to real time. Thus the problems associated with speech recognition may be generalized to the analysis to other data streams ranging from streaming media to the analysis of signal behavior in smart utility networks.

Thus, a need still remains for systems and methods for reducing bottlenecks in the analysis of data patterns in electronic and networked systems such as speech recognition systems used in cell phones. In view of the increasing need for real-time data analysis in the control of electronic devices and networks, it is increasingly critical that answers be found to these problems.

Further, in view of the ever-increasing commercial competitive pressures, along with growing consumer expectations and the diminishing opportunities for meaningful product differentiation in the marketplace, it is critical that answers be found for these problems.

Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a real-time data-pattern analysis system including: providing a memory module, a computational unit, and an integrated data transfer module arranged within an integrated circuit die; storing a data pattern within the memory module; transferring the data pattern from the memory module to the computational unit using the integrated data transfer module; and comparing processed data to the data pattern using the computational unit.

In addition, the present invention provides real-time data-pattern analysis system integrated within an integrated circuit die comprising: a memory module for storing a data pattern;

a computational unit for comparing processed data to the data pattern; and an integrated data module for transferring the data pattern from the memory module to the computational unit.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

Figure 1:
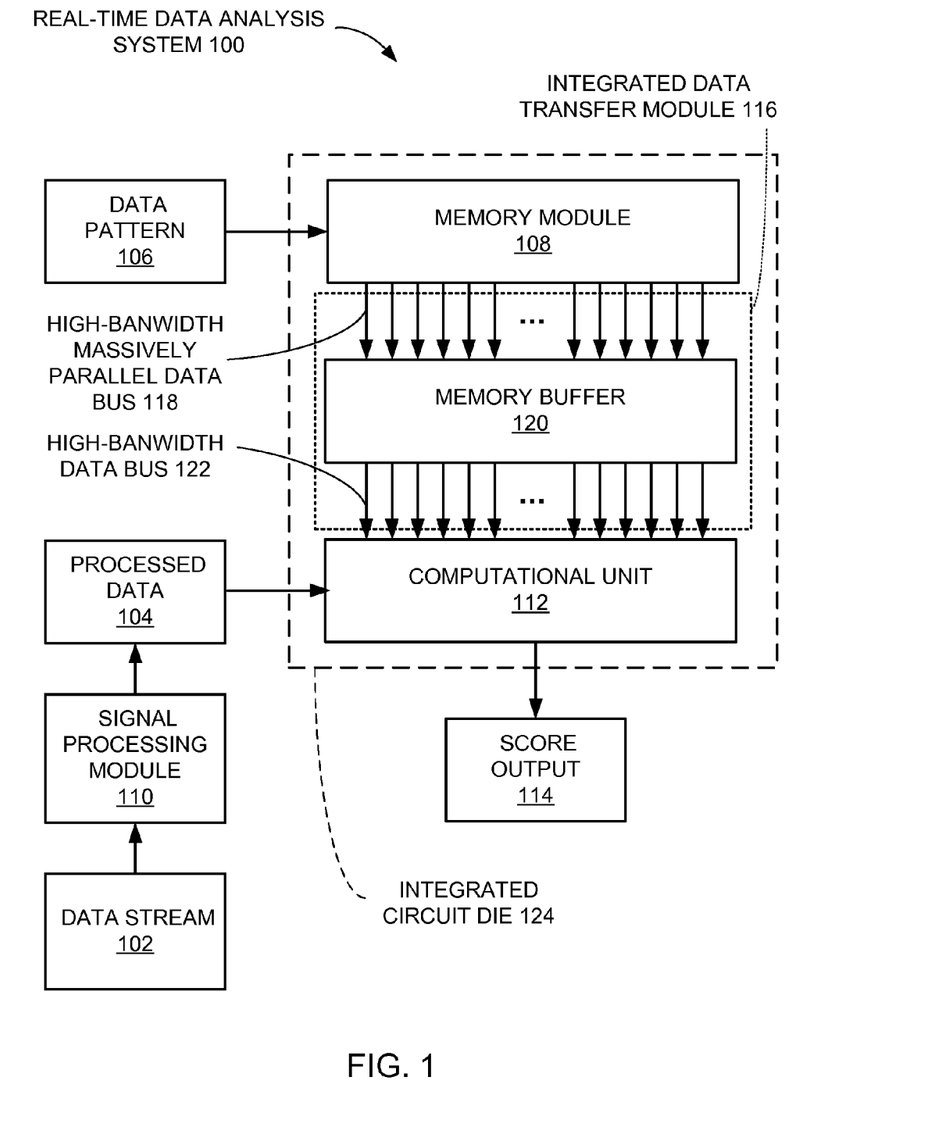
FIG. 1 is a schematic block diagram showing a real-time data-pattern analysis system 100 in an embodiment of the present invention.

Referring now to FIG. 1, therein is shown a schematic block diagram showing a real-time data-pattern analysis system 100 in an embodiment of the present invention. The architecture of the real-time data-pattern analysis system 100 is optimized to provide real-time analysis of a data stream 102 by comparing processed data 104 originating from the data stream 102 to a data pattern 106 stored in a memory module 108, which may be implemented using volatile memory such as a DRAM or non-volatile memory such as Flash memory.

In the preferred embodiment of the invention, the memory module 108 is implemented using non-volatile memory. Examples of non-volatile memory include NOR flash memory, NAND flash memory, phase change memory, resistive memory, magnetic RAM memory, or FERAM memory among many other options.

The real-time data-pattern analysis system 100 may include a signal processing module 110 for converting the data stream 102 to the processed data 104. Signal processing functions carried out by the signal processing module 110 may include analog-to-digital conversion, conversion from the time domain to the frequency domain, and/or any other signal manipulation that results in the appropriate conversion of the data stream 102 into the processed data 104 that can be compared to the data pattern 106.

A computational unit 112 computes a comparison between the processed data 104 and the data pattern 106, producing a score output 114 that quantifies pattern matching between the processed data 104 and the data pattern 106. In performing such comparison, the computational unit 112 must compare the processed data 104 to a plurality of different variations of the data pattern 106 residing in the memory module 108.

In one embodiment of the invention the comparison performed by the computational unit 112 is the calculation of a multivariate Gaussian probability for each instance of the data pattern 106 stored in the memory module 108 representing the "mathematical distance" between the processed data 104 and the data pattern 106.

The transfer of the data pattern 106 from the memory module 108 to the computational unit 112 is implemented using an integrated data transfer module 116 which may include a high-bandwidth massively parallel data bus 118, a memory buffer 120, and a high-bandwidth data bus 122.

It has been discovered that the rate-limiting step in the implementation of the real-time data-pattern analysis system 100 is data transfer between the memory module 108 and the computational unit 112. For this reason, a key aspect of the real-time data-pattern analysis system 100 is the integration of the memory module 108, the integrated data transfer module 116, and the computational unit 112 within an integrated circuit die 124. In an alternate embodiment of the present invention, the signal processing module 110 is also integrated within the integrated circuit die 124.

It has been unexpectedly observed that integration of the of the memory module 108, the integrated data transfer module 114, and the computational unit 112 within the integrated circuit die 124 enables implementation of the integrated data transfer module 114 in a way that maximizes interconnections while minimizing parasitics that may corrupt data transfer.

In a non-integrated configuration of a data pattern analysis system, data bus width between the memory module 108 and the computational unit 112 would be limited to the number of input/output contact pads available, which may range from 8 to 32 bits. In contrast, the implementation of the integrated data transfer module 114 within the integrated circuit die 124 enables a bus width exceeding 256 bits, directly translating into data transfer rates between the memory module 108 and the computational unit 112 exceeding 1 gigabyte per second.

It has been unexpectedly ascertained that the real-time data-pattern analysis system 100 may be employed for the real-time or close to real-time analysis of the data stream 102 that may be voice data, multi-media streaming data, or any data transmitted through a grid or network that requires analysis. For example, the real-time data-pattern analysis system 100 may be employed to recognize data signatures within a power transmission grid or local power circuitry, wherein the data signatures indicate anomalies or operation of a certain device within the grid or network.

It has been unexpectedly discovered that multiple instances of the real-time data-pattern analysis system 100 may used in parallel, providing scalability depending on the complexity of the data stream 102. For parallel use of the real-time data-pattern analysis system 100, additional modules (not shown) may be needed to manage the data stream 102 and to coordinate the function between instances of the real-time data-pattern analysis system 100.

Figure 2:
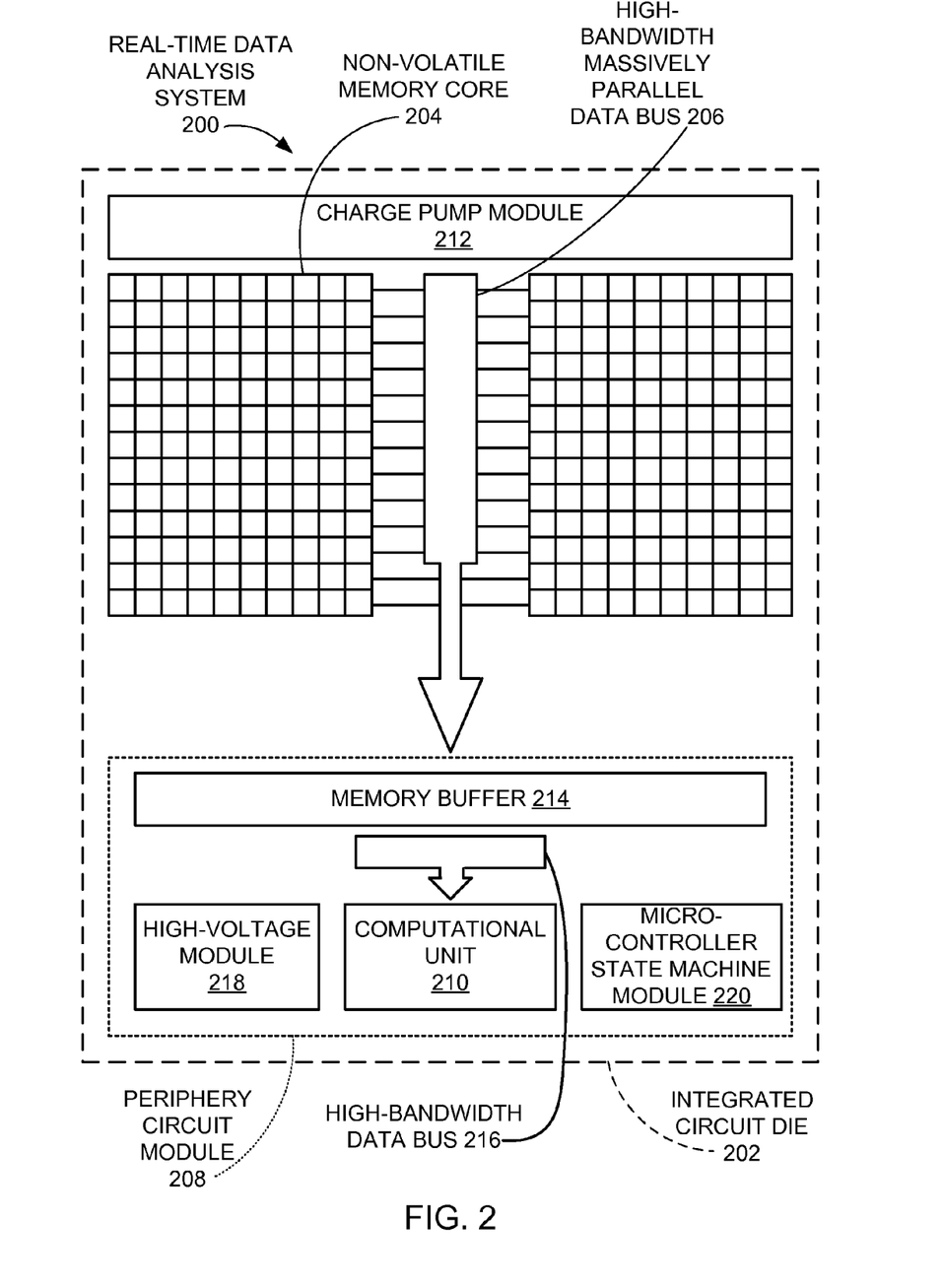
FIG. 2 is a schematic representation of the floor plan of a real-time data-pattern analysis system integrated within an integrated circuit die in another embodiment of the present invention.

Referring now to FIG. 2 therein is shown a schematic representation of the floor plan of a real-time data-pattern analysis system 200 integrated within an integrated circuit die 202 in another embodiment of the present invention. The real-time data-pattern analysis system 200 includes a non-volatile memory core 204 such as flash memory core array accessed through a high-bandwidth massively parallel data bus 206, which is used to transfer the data pattern 106 of FIG. 1 from the non-volatile memory core 204 to a periphery circuit module 208 containing a computational unit 210. The integrated circuit die 202 includes a charge pump module 212 for providing adequate voltage levels to support the non-volatile memory core 204 and the periphery circuit module 208.

The integrated circuit die 202 may contain one or more instances of the non-volatile memory core 204 as appropriate depending on the storage capacity needed for the real-time data-pattern analysis system 200. In some applications, for example, one or two instances of the non-volatile memory core 204 may be needed to store numerous instances of the data pattern 106 of FIG. 1, which may amount to a total required storage capacity of 600 megabits. Higher storage capacities are achievable by increasing the number of instances of the non-volatile memory core 204.

In a preferred embodiment of the present invention, the high-bandwidth massively parallel data bus 206 is at least 256 bits wide. Assuming that the non-volatile memory core 204 is implemented using high-speed NOR flash memory technology, the 256 bits may be read in burst mode in approximately 30 nanoseconds, representing an effective data transfer rate exceeding 1 gigabyte per second. Thus, it has been discovered that the implementation of the high-bandwidth massively parallel data bus 206 within the integrated circuit die 202 enables the implementation of 1 gigabyte per second data transfer rates between the non-volatile memory core 204 and the periphery circuit module 208 containing the computational unit 210.

The data pattern 106 of FIG. 1 enters the periphery circuit module 208 through a memory buffer 214, and is routed to the computational unit 210 through a high-bandwidth data bus 216. In one embodiment of the invention, the memory buffer 214 includes circuitry for implementing error correction code, a method of correcting for read errors. A high-voltage module 218 provides additional power conditioning for components in the integrated circuit die 202, and a microcontroller state machine module 220 provides chip control and external chip interface functions. Low-voltage power conditioning circuitry may be integrated within the microcontroller state machine module 220.

Figure 3:
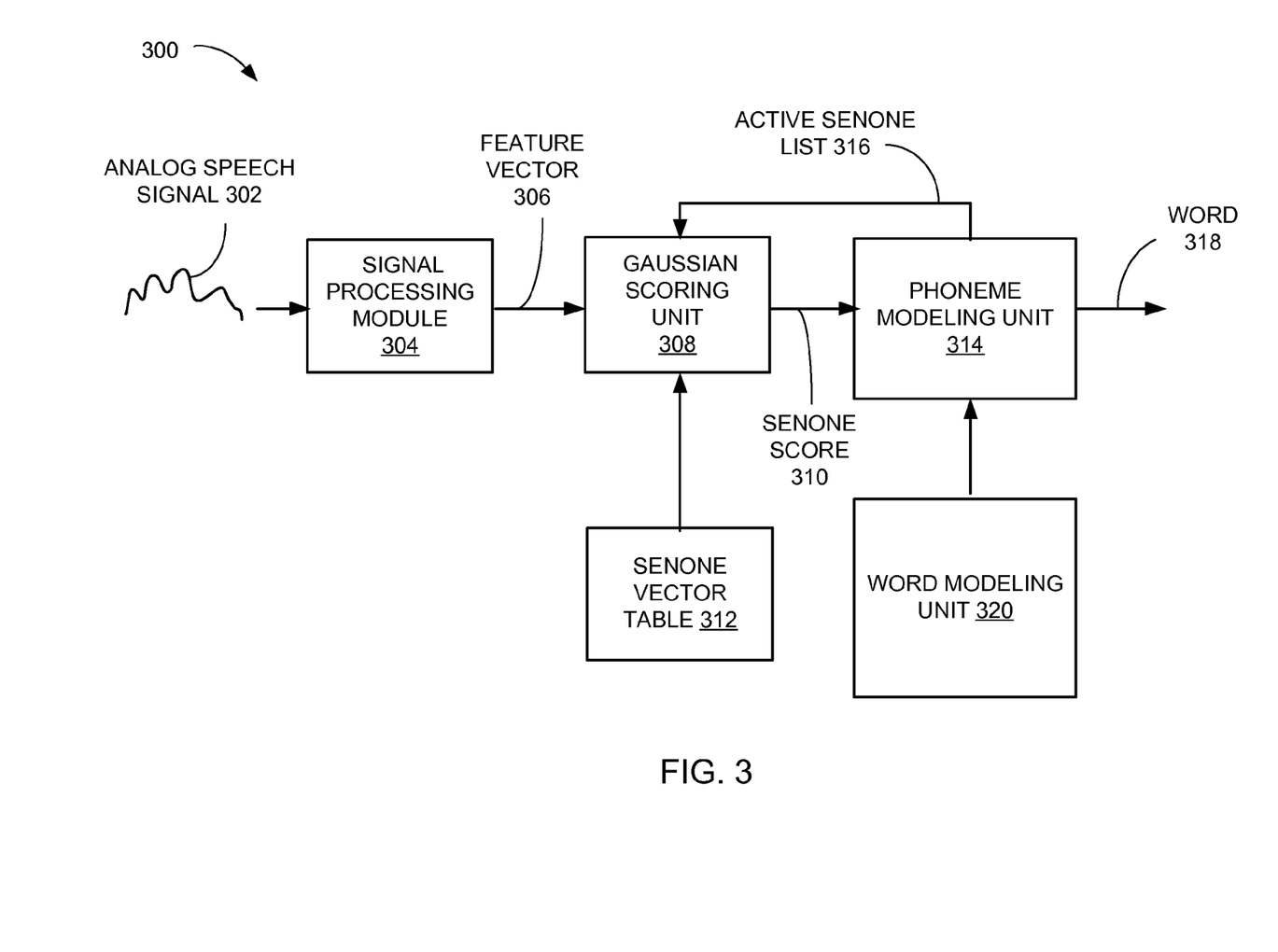
FIG. 3 is a flow chart illustrating a method of speech recognition 300 based on the Hidden Markov Model (HMM) used in still another embodiment of the present invention.

Referring now to FIG. 3, therein is shown a flow chart illustrating a method of speech recognition 300 based on the Hidden Markov Model (HMM) used in still another embodiment of the present invention. It should be noted that speech recognition systems based on Hidden Markov Models have a relatively high accuracy compared with other techniques. In such systems, the basic phonetic units ("phones") are described using Hidden Markov Models constructed of sub-phonetic units ("senones"). The accuracy of the speech recognition system is thus to a large extent determined by the number of senones that can be compared to an utterance in a given period of time. This process of senone scoring is typically the computational bottleneck of speech recognition systems.

An analog speech signal 302 enters a signal processing module 304, where it is converted into a feature vector 306, which is a digital representation of the analog speech signal 302. Mel-Frequency Cepstral Coefficients, coefficients that collectively represent the short-term power spectrum of a sound, may be employed to represent the analog speech signal 302. Only the first 13 cepstral coefficients may be required.

The feature vector 306 is presented to a Gaussian scoring unit 308, which is used to calculate a senone score 310 representing the mathematical distance or best fit between the feature vector 306 and one or more senones stored in a senone vector table 312. Information stored in the senone vector table 312 includes the means, covariances, and weighting factors for each vector component of each mixture of the senone model.

In the known state of the art, the senone vector table 312 is stored in a separate DRAM chip (not shown), which is uploaded with the senone data during the system power-up, and it is lost when the system is powered down. A phoneme modeling unit 314 provides an active senone list 316 to the Gaussian scoring unit 308. The active senone list 316 determines the selection of senones stored in the senone vector table 312 that needs to be compared to the feature vector 306.

There are additional stages that are used to recognize a word 318. The senone score 310 is routed to the phoneme modeling unit 314. A phoneme is the smallest segmental unit of sound needed to form meaningful contrasts between utterances. In the phoneme modeling unit 314, sequential senones are used to determine the most likely phoneme. Similarly, in a word modeling unit 320, sequential phonemes are used to determine the most likely selection of the word 318.

Figure 4:
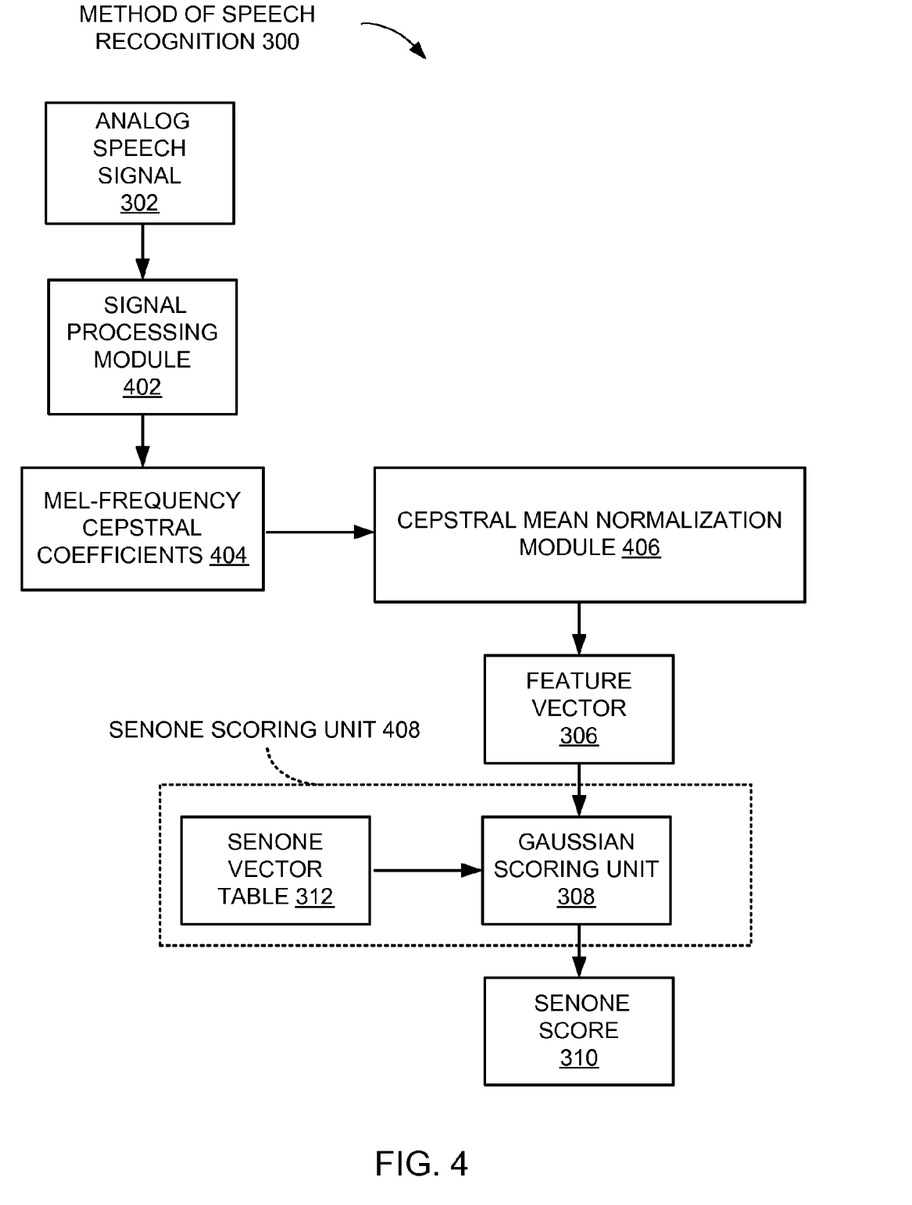
FIG. 4 is a flow chart illustrating further details of the front end of the method of speech recognition of FIG. 3.

Referring now to FIG. 4, therein is shown a flow chart illustrating further details of the front end of the method of speech recognition 300 of FIG. 3. The analog speech signal 302 is processed by a signal processing module 402. which outputs Mel-Frequency Cepstral coefficients 404. A Cepstral mean normalization module 406 compensates for distortion from the microphone and from environmental acoustics, leading to the creation of the feature vector 306. A senone scoring unit 408 incorporating the senone vector table 312 and the Gaussian scoring unit 308 employs the feature vector 306 to compute a senone score 310.

Figure 5:
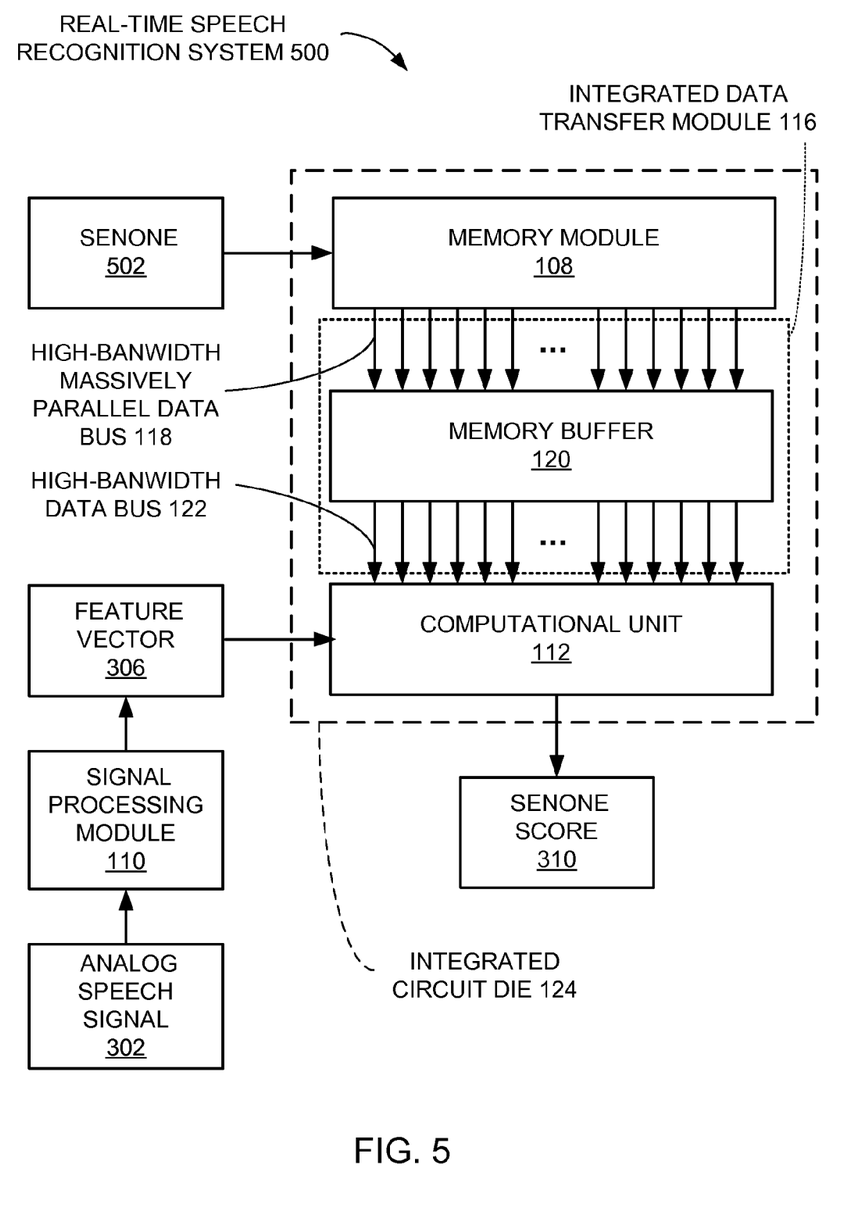
FIG. 5 is a schematic block diagram showing a real-time speech recognition system based on the a real-time data-pattern analysis system of FIG. 1 used in a further embodiment of the present invention.

Referring now to FIG. 5, therein is shown a schematic block diagram showing a real-time speech recognition system 500 based on the real-time data-pattern analysis system 100 of FIG. 1 used in a further embodiment of the present invention. The architecture of the real-time speech recognition system 500 is optimized to provide real-time—approximately 10 ms frame—analysis of the analog speech signal 302 by comparing the feature vector 306 originating from the analog speech signal 302 to a senone 502 stored in the memory module 108, which stores the senone vector table 312 of FIG. 3.

The real-time speech recognition system 500 may include the signal processing module 110 for converting the analog speech signal 302 to the feature vector 306. Signal processing functions carried out by the signal processing module 110 may include analog-to-digital conversion, conversion from the time domain to the frequency domain, and/or any other signal manipulation that results in the appropriate conversion of the analog speech signal 302 into the feature vector 306.

The computational unit 112 computes a comparison between feature vector 306 and the senone 502 stored in the memory module 108, producing the senone score 310 that quantifies the best fit between the feature vector 306 and the senone 502. In performing such comparison, the computational unit 112 must compare the feature vector 306 to a plurality of different variations of the senone 502 residing in the memory module 108. Thus, the computational unit 112, performs the function of the Gaussian scoring unit 308 of FIG. 3.

The transfer of the senone 502 from the memory module 108 to the computational unit 112 is implemented using the integrated data transfer module 116 which may include the high-bandwidth massively parallel data bus 118, the memory buffer 120, and the high-bandwidth data bus 122.

It has been discovered that use of the real-time speech recognition system 500 and the real-time data-pattern analysis system 200 shown in FIG. 2 can support such high data rates at a power consumption that can be sustained by portable devices such as a cell phone.

The real-time speech recognition system 500 solves the storage problem by providing a memory module 108 capable of storing well in excess of 13,000 variations of the senone 502. Each variation of the senone 502 is stored in binary form in the memory module 108 provided in the integrated circuit die 124. A standard method of storing senone information is a vector having 39 components. Each component of the vector has 32 bits of resolution, and the senone 502 is a mixture of 20 of these vectors. Considering the need to cover both male and female speech, storage requirements may be on the order of 650 megabits of information (the product of 13,000 senones, 39 components, 20 mixtures, 32 bits, and 2 codebooks), which is a capability that can be addressed by NOR flash memory.

For real-time operation, comparison of the feature vector 306 to a plurality of variations of the senone 502 stored in the memory module 108 must be done in frames of 10 milliseconds. Reading the senone 502 out of the memory module 108 and getting it into the computational unit 112 requires very high data transfer rates. It has been discovered that if the real-time speech recognition system 500 is implemented using NOR flash memory technology, 256 bits of information may be read in parallel in a burst mode taking 30 nanoseconds, representing a data transfer rate of 1 gigabyte per second which can support 8.5 millisecond frames.

Figure 6:
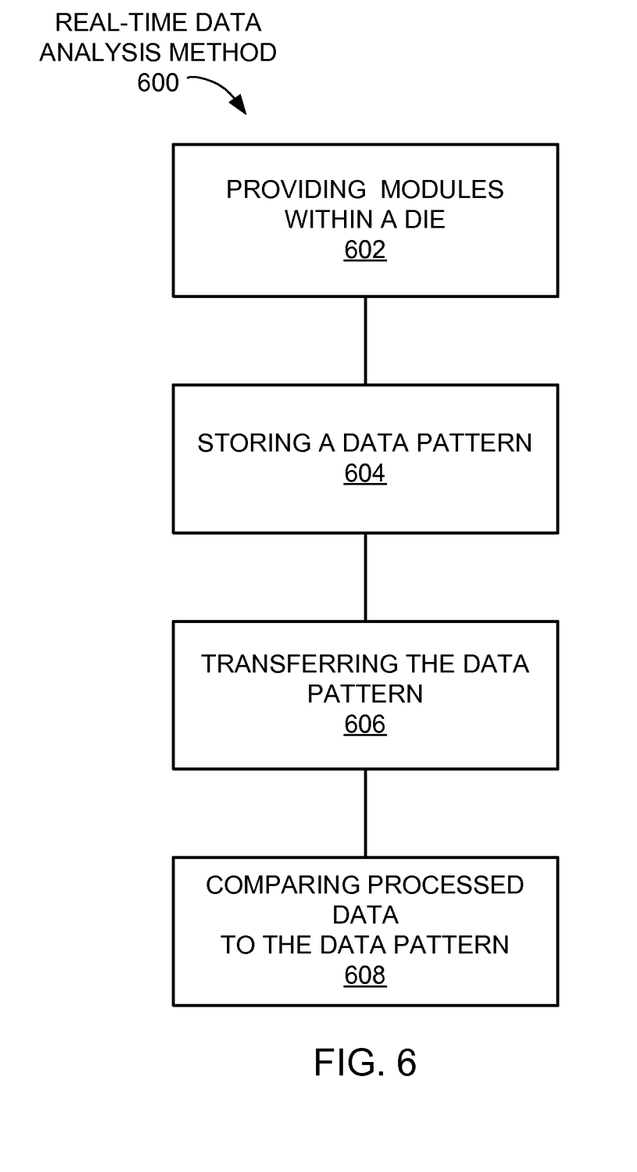
FIG. 6 is a flow chart of a method of operation of a real-time data-pattern analysis system in a still further embodiment of the present invention.

Referring now to FIG. 6, therein is shown a flow chart of a method 600 of operation of a real-time data-pattern analysis system in a still further embodiment of the present invention. The method 600 includes: providing a memory module, a computational unit, and an integrated data transfer module arranged within an integrated circuit die in a block 602; storing a data pattern within the memory module in a block 604; transferring the data pattern from the memory module to the computational unit using the integrated data transfer module in a block 606; and comparing processed data to the data pattern using the computational unit in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method comprising:
    storing a plurality of senones in a memory module;
    transferring the plurality of senones from the memory module to an integrated data transfer module at 256 bits per transfer and greater;
    transferring the plurality of senones from the integrated data transfer module to the computational unit;
    comparing processed data to the plurality of senones using the computational unit to generate one or more senone scores, wherein the memory module, integrated data transfer module, and computational unit are integrated on the same integrated circuit, and wherein the processed data is received by the integrated circuit from an external source; and
    transferring the one or more senone scores off-chip from the integrated circuit.

2. The method of claim 1, further comprising:
    converting a data stream into the processed data using a signal processing module.

3. The method of claim 1, wherein the comparing the processed data to the plurality of senones using the computational unit comprises generating a senone score output from the computational unit.

4. The method of claim 3, wherein the generating comprises calculating a multivariate Gaussian probability for the plurality of senones.

5. The method of claim 1, wherein the transferring the plurality of senones from the memory module to the integrated data transfer module comprises receiving the plurality of senones at a data transfer rate exceeding 1 gigabyte per second.

6. The method of claim 1, further comprising:
    controlling an external interface to the integrated circuit with a microcontroller state machine module.

7. The method of claim 1, wherein the transferring the plurality of senones from the memory module to the integrated data transfer module comprises transferring the plurality of senones from the memory module to the integrated data transfer module at greater than 256 bits, per transfer.

8. A system comprising:
    a memory module configured to store a plurality of senones;
    a computational unit configured to compare processed data to the plurality of senones; and
    an integrated data transfer module configured to receive the plurality of senones from the memory module at 256 bits per transfer and greater and to transfer the plurality of senones to the computational unit to generate one or more senone scores, wherein the memory module, integrated data transfer module, and computational unit are integrated on the same integrated circuit, wherein the processed data is received by the integrated circuit from an external source, and wherein the one or more senone scores are transferred off-chip from the integrated circuit.

9. The system of claim 8, wherein the memory module comprises a non-volatile memory core.

10. The system of claim 8 further comprising:
a microcontroller state machine module configured to control an external interface.

11. The system of claim 8, wherein the integrated data transfer module comprises a high-bandwidth massively parallel data bus, a memory buffer, and a high-bandwidth data bus.

12. The system of claim 8, further comprising:
a signal processing module configured to convert a data stream into the processed data.

13. The system of claim 8, wherein the computational unit is configured to calculate a senone score output.

14. The system of claim 13, wherein the senone score output is based on a multivariate Gaussian probability for the plurality of senones.

15. The system of claim 8, wherein the integrated data transfer module is configured to receive the plurality of senones at a data transfer rate exceeding 1 gigabyte per second.

16. The system of claim 8, wherein the integrated data transfer module is configured to receive the plurality of senones from the memory module at greater than 256 bits per transfer.

* * * * *